March 26, 1957 J. P. CHADOWSKI ET AL 2,786,884
AUTOMOBILE AERIALS
Filed July 24, 1953 2 Sheets-Sheet 2
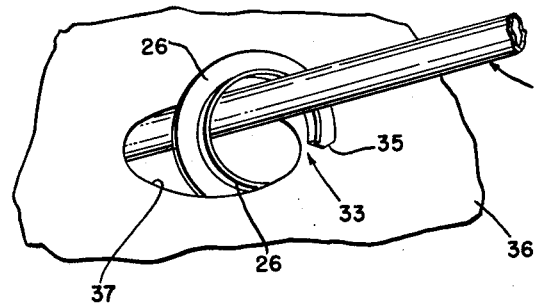
FIG. 3
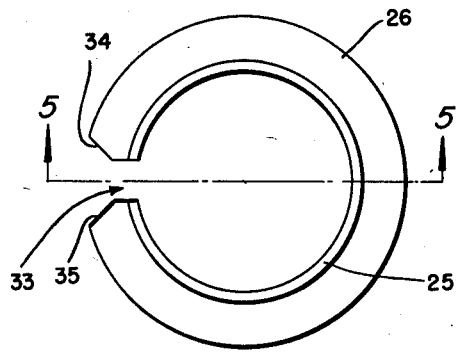
FIG. 4
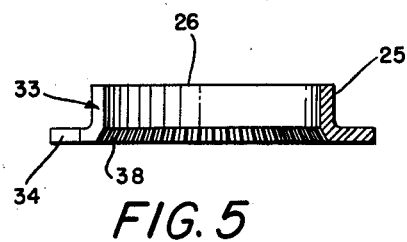
FIG. 5
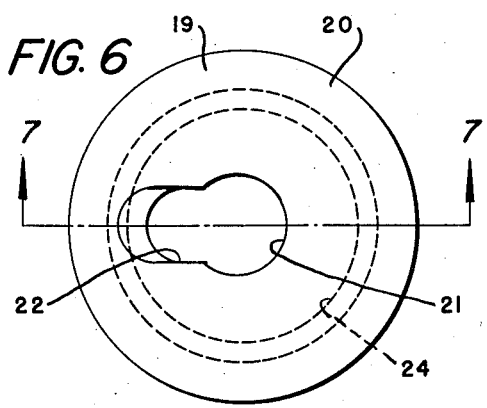
FIG. 6
FIG. 7
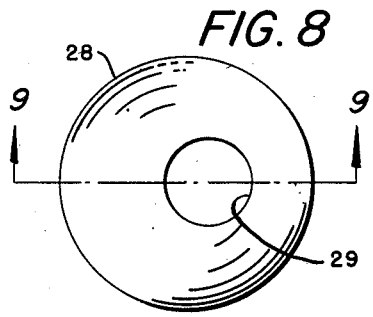
FIG. 8
FIG. 9
INVENTORS
JOSEPH P. CHADOWSKI &
BY  CHARLES J. BOGNAR
ATTORNEYS _United States Patent Office_

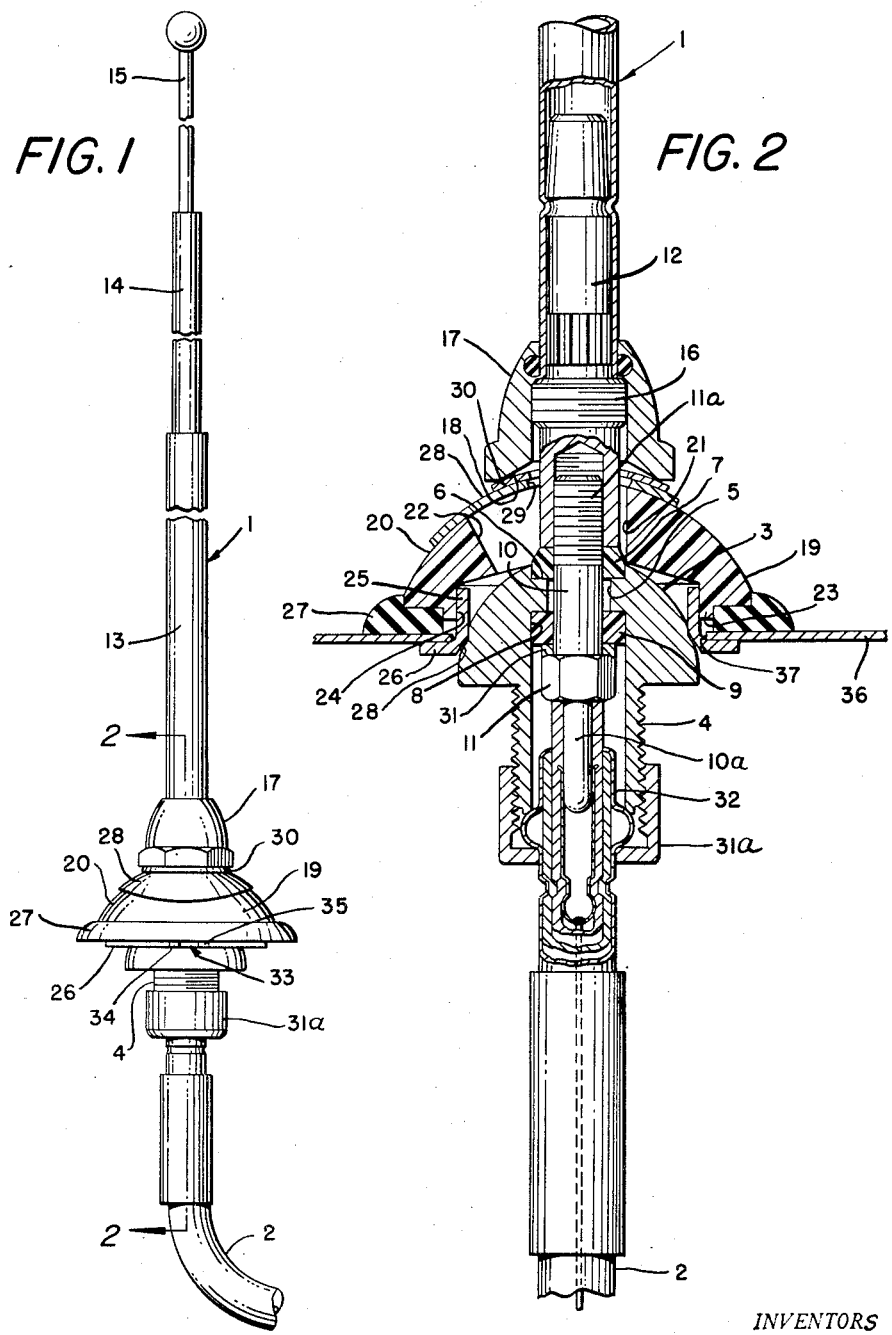

2,786,884
Patented Mar. 26, 1957

2,786,884
AUTOMOBILE AERIALS

Joseph P. Chadowski, Cleveland, and Charles J. Bognar, Parma, Ohio, assignors to Cornell-Dubilier Electric Corporation, South Plainfield, N. J., a corporation of Delaware Application July 24, 1953, Serial No. 370,090

6 Claims. (Cl. 174—153)

This invention relates generally to extensible automobile aerials, but has reference more particularly to an aerial of the quickly installable type.

A primary object of the invention is to provide an aerial of the character described which can be quickly and easily installed on an automobile by an individual, and without requiring installation operations on the undersurface of the automobile body part from which the aerial extends.

Another object of the invention is to provide an aerial of the character described, which is adjustable to a vertical position on an automobile, irrespective of the angle or inclination of the portion of the automobile from which the aerial extends.

A further object of the invention is to provide an aerial of the character described, which consists of a minimum number of parts which can be manufactured at low cost and easily and quickly assembled with each other to provide a unitary aerial.

Other objects and advantages of my invention will be apparent during the course of the following description.

In the accompanying drawings, forming a part of this specification, and in which like numerals are employed to designate like parts throughout the same, Fig. 1 is a fragmentary elevational view of an automobile aerial embodying the invention;

Fig. 2 is a vertical cross-sectional view of the aerial;

Fig. 3 is a view illustrating the manner in which the locking ring is inserted into an opening in a cowl or fender of an automobile;

Fig. 4 is a top plan view of the locking ring;

Fig. 5 is a cross-sectional view of the locking ring, taken on the line 5—5 of Fig. 4;

Fig. 6 is a top plan view of the insulator;

Fig. 7 is a cross-sectional view of the insulator, taken on the line 7—7 of Fig. 6;

Fig. 8 is a top plan view of the insulator hood, and

Fig. 9 is a cross-sectional view of the insulator hood, taken on the line 9—9 of Fig. 8.

Referring more particularly to the drawings, the antenna will be seen to comprise a base and rod assembly, generally designated by reference numeral 1, and a lead-in cable, generally designated by reference numeral 2.

The aforesaid assembly comprises a spacer having a hemispherical upper portion 3 and a lower cylindrical portion 4 of reduced diameter, which is exteriorly threaded. The spacer is provided with a central opening or passageway 5, the upper end of which is counterbored to provide a seat 6 for a beveled washer 7, and the lower end of which is counterbored to provide a seat 8 for a washer 9, the washers 7 and 9 being made of an insulating material, such for example, as polystyrene.

Extending through the washer 7, opening 5 and washer 9 is a connector stud 10 having a hexagonal portion 11 disposed within the counterbore 8 and a stem 10a of reduced diameter extending below the portion 11. The upper end of the connector stud 10 is threaded, as at 11a, for connection to the base 12 of an antenna mast assembly comprising a base section 13, an intermediate section 14 which is telescopically movable into section 13, and an upper section 15 which is telescopically movable into the sections 14 and 13. The lower end of the base 12 bears against the washer 7.

The base 12 is provided with a portion 16 of enlarged diameter which is exteriorly threaded for the connection thereto of a cap nut 17, and an O ring being interposed between the upper portion of this nut and the section 13 of the antenna mast assembly. The nut 17 has a conical surface 18 at its lower end.

Mounted on the base 12, between the nut 17 and the washer 7, is an insulator 19 having a spherical upper surface 20. The insulator 20 has a central opening 21 through which the base 12 extends, and from which a slot 22 extends radially, the slot 22 being of slightly less width than the diameter of the opening 21. The insulator 19 is also provided at its lower end with an annular flange 23, which forms an opening 24 into which the annular upstanding flange 25 of a split spacer or locking ring 26 extends. Interposed between the spacer or locking ring 26 and the insulator 19 is an annular rubber pad 27. The flange 25 of the spacer ring is adapted to be frictionally secured within the opening 24.

Mounted on the base 12 directly above the insulator 19 is an insulator hood or cuped washer 28 through which a circular opening 29 extends and which opening is eccentric to the axis of the washer. The hood or washer 28 is of a spherical form corresponding to the sphericity of the surface 20 of the insulator 19. A spherical washer 30 is interposed between the upper surface of the hood 28 and the surface 18 of the nut 17.

A split lock washer 31 is interposed between the washer 9 and the portion 11 of the stud 10.

The antenna lead-in cable 2 is provided with a nut 31a for attachment to the portion 4 of the spacer 3—4, and with a socket element 32 for reception of the stem 10a of the connector stud.

The ring 26, it may be noted, has a gap 33 therein, which, in practice is about 5/32" in width, and from which bevel surfaces 34 and 35 extend at an angle of about 45 degrees.

In order to mount the antenna on the cowl or fender 36 of an automobile, a hole 37 is drilled in the cowl or fender, this hole being of a diameter approximately the same as the external diameter of the flange 25 of the ring 26. The hole should not be drilled oversize, and to facilitate the drilling, the split locking ring 26 may be removed from the assembly and used as a gage. The edge of the hole is then scraped or sanded in order to provide a good ground contact.

The lead-in cable 2 is then attached to the base and rod assembly 1, and the nut 17, washer 30, hood 28, insulator 19 and pad 27 are slid upwardly on the base section 13 of the antenna rod assembly, so as to leave the ring 26 free. The lead-in cable 2 and spacer 3—4 are then inserted into and through the hole 37 from above the hole.

The antenna rod is then tipped, so as to permit insertion of the ring 26 into the hole 37 in the manner shown in Fig. 3. This manner of inserting the ring is facilitated by the provision of the relatively wide gap 33 in the ring and the bevel surfaces 34 and 35, the ring being virtually rotated about its axis while being thus inserted. It may be noted, at this point, that the ring is insertable through the hole 37 without distorting or twisting the ring in any manner.

After the ring has been inserted through the hole 37, the antenna rod is righted, and the flange 25 of the ring brought upwardly into the hole 37. The washer 30, hood 28, insulator 19 and pad 27 are then slid downwardly on the base section 13 of the antenna rod assembly, thereby securing all of the parts together in the manner shown in Fig. 2.

If the antenna, following the aforesaid operations, is not positioned vertically, it may be so positioned by rotating the insulator 19 to a position in which the base 12 may be moved in the slot 22 to a vertical position. If, after the antenna has been thus moved to a vertical position, any portion of the slot 22 is still exposed, the hood 28 may be rotated about the base 12 to a position in which it completely covers the slot. This covering action is facilitated by reason of the eccentric location of the opening 29 in the hood.

Finally, the nut 17 is tightly secured to the base 12, to rigidly secure all of the parts in assembled relation. The spherical washer 30 takes the thrust of the nut 17 during this tightening operation, so as to prevent rotation of the hood 28 during the tightening or marring of the surface of said hood.

The ring 26 is provided with knurling or serrations 38 which, during the tightening operation bite into the surface of the spacer 3—4, thereby preventing accidental turning of the ring.

It may also be noted that all of the loading is in a direction radially of the center of the spherical portion 3 of the spacer. This tends to eliminate slipping of the parts.

It is thus seen that we have provided an automobile antenna or aerial which can be quickly and easily installed on an automobile by an individual, without requiring installation operations on the undersurface of the automobile body part, such as the cowl or fender, from which the aerial extends.

It is also seen that we have provided an aerial mounting which permits adjustment of the aerial to a vertical position, irrespective of the angle or inclination of the cowl or fender, and that the aerial consists of a minimum number of parts which can be manufactured at low cost and easily and quickly assembled with each other to provide a unitary aerial.

It is to be understood that the form of our invention, herewith shown and described, is to be taken as a preferred example of the same, and that various changes in the shape, size and arrangement of parts may be resorted to, without departing from the spirit of the invention, or the scope of the subjoined claims.

Having thus described our invention, we claim:

1. In combination with an automobile part having an opening therein, an antenna base and rod assembly, an antenna lead-in cable having a substantial portion thereof coaxial with said antenna base and rod assembly, said base and lead-in cable being insertable into and through said opening from above the opening, a locking ring adapted to be inserted through said opening from above the opening, said ring having a base portion adapted to underlie the body part adjacent said opening, and means for rigidly securing said antenna base and rod assembly to said locking ring, said base and rod assembly including a spacer for spacing the rod from the antenna lead-in cable, said spacer having an upper spherical portion, said locking ring being supported on the spherical surface of said spherical portion.

2. In combination with an automobile body part having a circular opening therein, a spacer member having a portion provided with a spherical surface which is disposed in said opening, an antenna rod assembly secured to said spacer member, a split locking ring having a base portion disposed below said opening and a flange extending into said opening, said locking ring bearing against said spherical surface, whereby an upward pull on said spacer member causes the pressure of said locking ring to be transmitted to said surface in a direction radially of the center of said spherical surface, and means for covering said opening, the maximum diameter of said spherical portion being less than the diameter of said circular opening, whereby said spacer member may be inserted into and through said opening from above the opening.

3. The combination, as defined in claim 2, in which said covering means comprises an insulator having a central opening through which said antenna rod assembly passes and a slot extending radially from said central opening, whereby said antenna rod assembly may be moved radially from said central opening.

4. The combination, as defined in claim 3, in which said spacer member has a depending threaded cylindrical portion, and an antenna lead-in cable is provided having a nut adapted for attachment to said threaded portion of said spacer member.

5. The combination, as defined in claim 4, in which said antenna rod assembly includes a base, and a connector stud is threadedly connected to said base, said stud having a stem frictionally secured to said antenna lead-in cable.

6. The combination, as defined in claim 5, in which said base is provided with an externally-threaded portion, and a nut is threadedly secured to said portion of the base, said nut adapted to be tightened against said insulator.

References Cited in the file of this patent

UNITED STATES PATENTS

| | | |
|---|---|---|
| 2,524,534 | Morris et al. | Oct. 3, 1950 |
| 2,536,733 | Finke et al. | Jan. 2, 1951 |
| 2,664,506 | Race | Dec. 29, 1953 |
| 2,693,372 | Ludwig et al. | Nov. 2, 1954 |